G. W. GOODWYN.
Cultivator and Cultivator Teeth.
No. 222,893.   Patented Dec. 23, 1879.
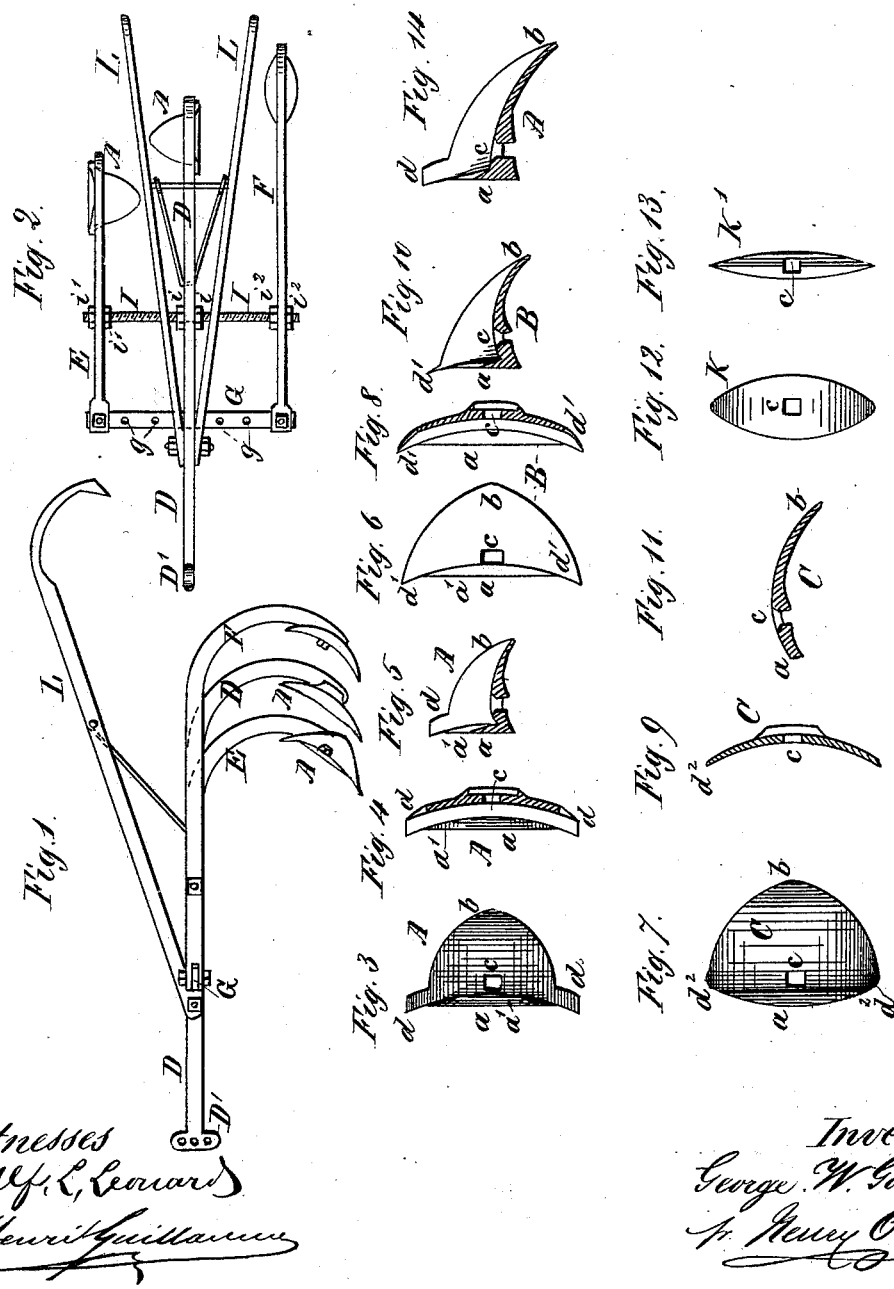

UNITED STATES PATENT OFFICE.

GEORGE W. GOODWYN, OF PETERSBURG, VIRGINIA, ASSIGNOR OF ONE-HALF OF HIS RIGHT TO PASCAL DAVIE, OF SAME PLACE.

IMPROVEMENT IN CULTIVATORS AND CULTIVATOR-TEETH.

Specification forming part of Letters Patent No. 222,893, dated December 23, 1879; application filed August 16, 1879.

*To all whom it may concern:*

Be it known that I, GEORGE W. GOODWYN, of the city of Petersburg, in the county of Dinwiddie and State of Virginia, have invented new and useful Improvements in Cultivators and Cultivator-Teeth, as fully described hereinafter, and shown in the annexed drawings, in which—

Figures 1 and 2 represent, in side elevation and plan view, my improved cultivator. Figs. 3, 4, and 5 are, respectively, a front elevation, a longitudinal section, and a transverse section of my improved cultivator-tooth. Figs. 6 and 7 are front elevations, Figs. 8 and 9 longitudinal sections, and Figs. 10 and 11 transverse sections, of another form of cultivator-tooth, being a slight modification in construction of the cultivator-tooth shown by Figs. 2, 3, and 4; and Figs. 12 and 13 show front elevations, and Fig. 14 longitudinal section, of a cultivator-tooth employed in combination with the above.

In the cultivation of young crops of whatsoever nature, when such crops are sufficiently grown to permit a cultivator being run through the rows, what is termed "level cultivation" is resorted to—that is to say, the cultivation or upturning of the soil is effected in such a manner as to leave the surface of the soil as level as possible. With certain crops—such as cotton, tobacco, peanuts, corn, and others— the first cultivation is, as above stated, a level cultivation; but when these plants have arrived at a certain stage of their growth they require a second, and in some cases a third, cultivation. These two latter are the reverse of the former. Instead of level cultivation being resorted to, what is termed "hilling" is now resorted to—that is to say, throwing the soil around the stem or stalk of the plant both for support and to prevent what is called "top" or "surface" rooting.

In either of the above methods of cultivation it is essential that the soil be thoroughly stirred not only between the rows, but as close to the stem or stalk of the plant as is possible—first, to uproot all the weeds and prevent the crop from being choked; secondly, to admit air and moisture freely to the roots of the plant.

With the construction of cultivator-teeth now in use it is an impossibility to run close up to the plant and properly turn over the soil, except with such teeth resembling and performing the function of harrow-teeth. The cultivation with such teeth is, however, undesirable, as the soil is only what is termed "scratched," instead of being thoroughly upturned; nor is the weeding thoroughly effected, while it is impossible to hill up the plants.

The object of my invention is to effect the desired result, and enable the farmer to cultivate closely, whether in hilling or level cultivating; and the further object of my invention is to so construct the cultivator-teeth that by proper arrangement upon the cultivator-standard the same teeth may be employed for either method of cultivation; and to that end my invention consists, first, in the construction of a cultivator-tooth having practically a straight land-side and an enlarged shovel-shaped and curved furrow-side, the straight line of the land-side and the curved line of the furrow-side intersecting at points equidistant from the point of attachment to the standard, or nearly so, to form the cultivating-points, said tooth being concave from point to point, and convex from the land-side to the furrow-side, and reversible upon its standard; second, in the construction of a cultivator-tooth substantially as above set forth, and having its point of greatest convexity on the line of its attachment to the standard, but nearer the land-side than the furrow-side; third, in the construction of a cultivator-tooth substantially as first above set forth, and provided on the land-side with a cutting-share formed at right angle to the straight land-side, or nearly so, and having share or chisel shaped cultivating-points formed by the extension of the straight line of the land-side and the curved line of the furrow-side in continuation of said straight land-side; fourth, in the combination, with two of the standards of a cultivator, carrying each one of my improved cultivator-teeth, of a third standard carrying an ordinary cultivator-tooth, all as hereinafter fully described and set forth.

In the accompanying drawings, A represents a cultivator-tooth having a straight land-side, a, provided with a cutting-share or mold-board, a', formed at right angles to said land-side, and having an enlarged shovel-shaped and curved furrow-side, b, the straight line of the land-side and the curved line of the furrow-side meeting at points equidistant, or practically so, from the point of attachment, c, to the standard, and terminating in a cultivating point or points, d, which points are practically a continuation of the straight land-side, as shown.

The point or points d may be made in the form of a share-point, Figs. 3, 4, and 5, or a simple cutting-point formed by the intersection of the land-side straight line and the furrow-side curved line, Figs. 6, 8, and 10, or a rounded point formed by said intersecting lines, Figs. 7, 9, 11, according to the soil and the state and nature of the crops it is intended to cultivate.

The tooth A is concave from point to point, and has its attachment c to the standard formed centrally of and on a line with the points d, or nearly so, and it is convex from the land to the furrow side, the greatest convexity being at c, or midway between the points d, but nearer to the land-side than the furrow-side.

By this construction of plow-tooth I am enabled to run as close up to the plants as it is desired—in fact, up to the stalk or stem of the plant. The tooth, being provided with a cutting-share or mold-board, will make a clean cut and turn over the soil close to the row of plants, while the enlarged shovel-shaped furrow-side will throw the soil over into the row between the plants, turning it over at the same time, the mold-board or cutting-share a' and the curvature or convexity diametrically of the tooth effecting this desired result.

In this manner I am enabled to cultivate to any desired depth over the roots of the plant, and loosen the soil and throw it away from them.

In stiff clayey soil and in fields well overgrown with weeds I employ the tooth having the share-points d. In light sandy soils, or for a second cultivation, I employ a cultivator-tooth having the pointed cutting ends d', Figs. 6, 8, and 10, or the rounded point, Figs. 7, 9, and 11; and under some circumstances I may dispense with the cutting-share or mold-board a', using simply a tooth having a straight land-side, a, an enlarged shovel-shaped and curved furrow-side, b, forming the rounded cultivating point or points $d^2$, Figs. 7, 9, 11.

When the cultivator-tooth is employed upon a parallel cultivator or gang-plow I preferably employ the tooth A, Figs. 3, 4, and 5, in combination with the modified form of teeth B C, Figs. 6, 7, 8, 9, 10, and 11, as presently explained.

Instead of making the highest point of convexity at the point of attachment c, it may be made at the cutting-share, so as to give to the cultivator-tooth a gradual convex curve from the land-side to the furrow-side, as shown by Fig. 14, this being desirable for "wet-plowing"—that is to say, when the ground is not sufficiently dry to permit of the soil falling to pieces or crumbling, and to prevent it from sticking to the cultivator-tooth.

It is also evident that, instead of making the cultivator-tooth reversible, or with two points, having its attachment to the standard centrally between said points and on a line therewith, the cultivator-tooth may be made with one point only.

I prefer, however, to form the tooth with two points to make it reversible upon its standard—first, with a view to economy in case one of the points should be accidentally broken, and to avoid the necessity of employing a great number of such teeth; secondly, in the cultivation of crops with this tooth it is desirable that it should be reversible, for the purpose presently explained.

In Figs. 1 and 2 I have shown an improvement in the construction of cultivators, and in these figures D E F represent three cultivator beams and standards, the former having at its forward end a clevis, D', the purpose of which is obvious.

The beams and standards E F are adjustably connected with the central beam, D, by means of the bar G, provided with a series of bolt-holes, g, by means of which the beams are bolted to said bar G, which passes through a slot in the beam D. The beams are further connected together by means of the adjusting-rod I, screw-threaded to receive the nuts $i$ $i$ $i'$ $i'$ $i^2$ $i^2$, which hold the plow-beams in their respective position when adjusted upon said rod and the bar G, the rod, like the bar, passing through the central beam, D. By means of this arrangement one or more of the beams may be employed in the cultivation of the crops, and the plow-beams may be set closer to or farther from each other, according to the width of the rows.

I preferably construct the cultivator of wrought-iron, to make it strong and light and compact, so as to adapt it for use with three beams in comparatively closely-planted rows of plants, using cultivator-teeth of corresponding dimensions, as it is evident that these latter may be made of any desired size. L are the handles, braced to the beam D in rear and attached thereto in front.

In the cultivation of crops my improved tooth is used as follows: In level cultivation I employ usually three cultivator-teeth, A, K, or K', two of A and one of K or K'. (Shown in Figs. 12 and 13.) In operation one tooth, A, upon standard E runs close to the stalk or stem of the plant and turns over and away from it the soil. A like tooth is placed upon standard D, following the former, but attached to the standard in a reversed position, so that the straight land-side will become the furrow-side to take up the soil thrown away from the plants, to thoroughly pulverize it or crumble it and return it to the plants; and this latter tooth may be followed by either of the teeth K or K', to cultivate the center of the row. When the soil is in the condition just described I preferably employ the tooth K.

It will be seen that by this arrangement and construction of cultivator-teeth the roots are never left bare to be dried up under a hot sun or drowned out by heavy rains, as is frequently the case when cultivated with the cultivator-teeth now in use.

When it is desired that a crop should be hilled, I employ two or three cultivator-teeth, A. When three such teeth are employed, those on standards D F are both reversed relatively to the one on standard E, which, following the line of plants close to the stalks or stems, effects the cultivation. The other two, reversed, effect the hilling; and if the crop has been thoroughly cultivated prior to hilling all three plows may be reversed—that is to say, so attached to the standards that their shovel-shaped furrow-edges will follow the line of plants; or two plows or cultivator-teeth, A, may be employed upon standards D E, as described, and the modified construction of tooth C or B, or one of the teeth K or K', upon standard F.

In crops where the hilling is a restricted one, three of the teeth B, C, and K or K' may be employed in the manner above described, or two teeth, B, and one, C, or one of the teeth C or B, in combination with two of the teeth K or K'.

From what has been said above it will be seen that a set of my improved cultivator-teeth, either with or without the cultivator-teeth K K', are adapted, by reversal and interchange, to cultivate all kinds of crops in all kinds of soils, and effect the very best cultivation.

I am aware that cultivator-teeth having a straight land-side provided with a cutting-share or mold-board and a shovel-shaped furrow-side have been in use heretofore; but these were generally constructed with the shovel-shaped furrow-side at right angles, or straight and flat, to the land-side; and I do not wish to claim such a construction.

In practice it has been found that shovel-plows or cultivator-teeth constructed as above described are impracticable, from the fact that they throw the soil in front of the plow instead of guiding it to one side into the row.

Having now described my invention, what I claim is—

1. A reversible cultivator-tooth having, practically, a straight land-side and an enlarged shovel-shaped and curved furrow-side, the straight line of the land-side and the curved line of the furrow-side intersecting to form the cultivating-points, said tooth being concave from point to point and convex from the land-side to the furrow-side, substantially as and for the purpose specified.

2. A reversible cultivator-tooth having a straight land-side and an enlarged shovel-shaped and curved furrow-side, the straight line of the land-side and the curved line of the furrow-side meeting to form the share or chisel-shaped cultivating-points in continuation of the straight land-side, said tooth being concave from point to point and convex from land-side to furrow-side, substantially as described.

3. A reversible cultivator-tooth having a straight land-side provided with a cutting-share or mold-board formed at right angles thereto and an enlarged shovel-shaped and curved furrow-side, the straight line of the land-side and the curved line of the furrow-side intersecting to form the cultivating-points, said cultivator tooth being concave from point to point and convex from the land-side to the furrow-side, substantially as described.

4. A reversible cultivator-tooth having a straight land-side with a cutting-share or mold-board formed at right angles thereto and an enlarged shovel-shaped and curved furrow-side, the straight line of the land-side and the curved line of the furrow-side meeting to form the share or chisel-shaped cultivating-points $d$ $d$, in continuation of said straight land-side, the cultivator-tooth being concave from point to point and convex from the land-side to the furrow-side, substantially as described.

5. A reversible cultivator-tooth having, practically, a straight land-side and an enlarged shovel-shaped and curved furrow-side, the straight line of the land-side and the curved line of the furrow-side intersecting to form the cultivating-points, said tooth being concave from point to point and convex from the land-side to the furrow-side, and having its greatest convexity at the point of attachment to the standard nearer the land-side than the furrow-side, as set forth.

6. In a cultivator, the combination of the standards E D, carrying the interchangeable and reversible teeth described, with the standard F, carrying the tooth K, arranged and operating together substantially as described, for the purpose specified.

In witness that I claim the foregoing I have hereunto set my hand this 13th day of August, 1879.

GEO. W. GOODWYN.

Witnesses:
 FORTESCUE WHITTLE,
 W. J. MAY.